United States Patent [19]

Kremer et al.

[11] 4,285,696
[45] Aug. 25, 1981

[54] DYESTUFFS DERIVED FROM TRIPHENYLMETHANE, THEIR PREPARATION AND USE

[75] Inventors: Gilbert V. H. Kremer, Ermont; Jacques P. E. Pechmeze, Paris; Robert F. M. Sureau, Enghien les Bains, all of France

[73] Assignee: P C U K Produits Chimiques Ugine Kuhlmann, Courbevoie, France

[21] Appl. No.: 779,436

[22] Filed: Mar. 21, 1977

Related U.S. Application Data

[63] Continuation of Ser. No. 483,184, Jun. 25, 1974, abandoned.

[30] Foreign Application Priority Data

Jul. 6, 1973 [FR] France .................... 73 24873

[51] Int. Cl.³ .................................. C09B 11/10
[52] U.S. Cl. ........................... 8/654; 260/393
[58] Field of Search .................. 260/393; 8/657, 654

[56] References Cited

U.S. PATENT DOCUMENTS

| | | | |
|---|---|---|---|
| 2,466,008 | 4/1949 | Dickey | 260/380 |
| 2,466,009 | 4/1949 | Dickey | 260/380 |
| 2,516,106 | 7/1950 | Dickey | 260/573 |
| 3,535,347 | 10/1970 | Bitterli | 260/393 |
| 3,538,105 | 11/1970 | Yamaya et al. | 260/393 X |
| 3,828,071 | 8/1974 | Kast et al. | 260/393 X |

FOREIGN PATENT DOCUMENTS 1223474 2/1971 United Kingdom ............ 260/389

OTHER PUBLICATIONS

Ono, S. "N-[Bis(p-dimethylaminophenyl) methyl] anilines" in Chem. Abs., vol. 67, 1967, p. 11153, 118097y.
Dronkina, M. et al. "Triphenylmethane dyes containing bis(trifluoromethyl)amino groups" vol. 80, 1974, 134887e, Article dated 1973 prior to U.S. Filing date.

*Primary Examiner*—Winston A. Douglas
*Assistant Examiner*—Raymond K. Covington
*Attorney, Agent, or Firm*—Beveridge, DeGrandi, Kline & Lunsford

[57] ABSTRACT

Dyestuffs of the formula:

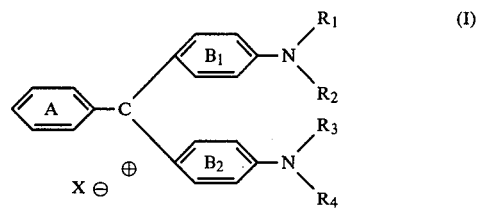

in which $R_2$ and $R_4$ which are the same or different each represent a hydrogen atom or an alkyl, hydroxyalkyl or cyanethyl group, one of the substituents $R_1$ and $R_3$ represents the 2,2,2-trifluoroethyl group and the other substituent represents an alkyl group or the 2,2,2-trifluoroethyl group, the ring A is unsubstituted by or substituted by one or 2 chlorine atoms or an alkoxy or alkyl group, the rings $B_1$ and $B_2$ are each unsubstituted or substituted by at least one alkyl or alkoxy group and X represents a colorless monovalent anion; process for the preparation of such dyestuffs; process for the coloration with such dyestuffs based on a polymer or copolymer of acrylic nitrile or on polyamides or polyesters which have been modified by anionic groups; and fibres based on a polymer or copolymer of acrylic nitrile or on polyamides or polyesters which have been modified by anionic groups colored by means of such dyestuffs.

7 Claims, No Drawings

DYESTUFFS DERIVED FROM TRIPHENYLMETHANE, THEIR PREPARATION AND USE

This is a continuation, of application Ser. No. 483,184 filed June 25, 1974, now abandoned.

The present invention relates to new cationic dyestuffs of the triphenylethane series, particularly suitable for dyeing fibres based on polymers or copolymers of acrylonitrile and also fibres based on polyamides or polyesters which are copolymerised or polycondensed with compounds having an anionic character.

According to the present invention dyestuffs are provided of the general formula:

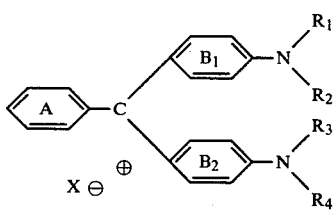
(I)

in which $R_2$ and $R_4$ which are the same or different each represent a hydrogen atom or an alkyl, hydroxyalkyl or cyanethyl group, one of the substituents $R_1$ and $R_3$ represents the 2,2,2-trifluoroethyl group and the other substituent represents an alkyl group or the 2,2,2-trifluoroethyl group, the ring A is unsubstituted or substituted by one or two chlorine atoms or an alkoxy or alkyl group; the rings $B_1$ and $B_2$ are each unsubstituted or substituted by at least one alkyl or alkoxy group and x represents a monovalent colourless anion.

In the above definitions, the alkyl and alkoxy groups are preferably groups having 1 to 4 carbon atoms, for example methyl or ethyl groups. When substituted the rings $B_1$ and $B_2$ preferably contain no more than two alkyl or alkoxy groups.

The dyestuffs of formula (I) may be prepared for example by condensing a molecule of a benzaldehyde of the formula:

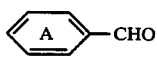
(II)

the nucleus of which may be substituted as indicated above, with two molecules of an amine of the formula:

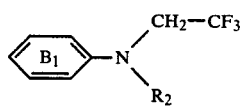
(III)

in which the substituents of $B_1$ and the meanings of $r_2$ are the same as given above, and by oxidising the leuco derivative obtained.

The dyestuffs of formula (I) may also be prepared for example by condensing a p-amino benzophenone of the formula:

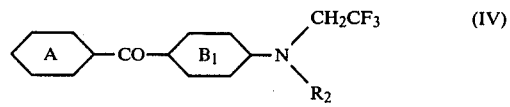
(IV)

with an aniline of the formula:

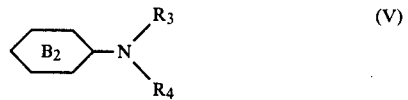
(V)

in the presence of a condensing agent such as for example, phosphorus oxychloride. Under the same conditions, a p-aminobenzophenone of the formula:

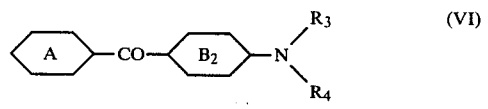
(VI)

may also be condensed with an aniline of formula (III). In these formulae, the substituents of A, $B_1$ and $B_2$ and the meaning of $R_2$, $R_3$ and $R_4$ are the same as given above.

The dyestuffs of the invention enable a whole range of shades from violet to dark brown passing through a variety of blues, turquoise and greens to be obtained on fibres based on polymers or copolymers of acrylonitrile and also on polyamide or polyester fibres having an acid character, and these shades have remarkable fastness, especially to light. This latter property is completely exceptional, especially with regard to the blue and turquoise shades derived from triphenylmethane.

The invention is illustrated by the following Examples in which the parts are parts by weight unless otherwise stated.

EXAMPLE 1

A mixture of 27 parts of 2'-chloro-4-dimethylaminobenzophenone, 17.5 parts N-(2,2,2-trifluoroethyl) aniline, 85 parts of phosphorus oxychloride and 10 parts of phosphorus pentoxide is refluxed for one hour. The mixture is cooled and poured onto 1000 parts of crushed ice and the mineral acidity is neutralised by means of sodium acetate. The dyestuff precipitates in gum form. The floating aqueous phase is decanted. In order to purify the dyestuff it is dissolved in 200 parts of acetic acid diluted with 2000 parts of boiling water and the solution is filtered after 5 parts of animal black have been added. The dyestuff is precipitated in the filtrate by adding a solution of 50% zinc chloride. The dyestuff of the formula:

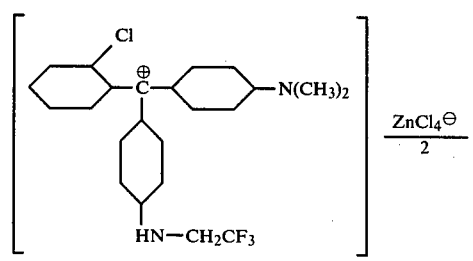

is precipitated. It dyes acrylic fibres a blue shade which is fast to light.

EXAMPLE 2

19 parts of N-methyl N-(2,2,2-trifluoroethyl) aniline, 14.5 parts of water and 3 parts of concentrated sulphuric acid are mixed. After the addition of 6 parts of 2-chlorobenzaldehyde, the mixture is heated at 100° C. for 10 hours. The mixture is cooled and poured into 500 parts of ice water and neutralised at pH 7 with a solution of sodium hydroxide. The leuco dyestuff is isolated by filtration and washed in water.

The dyestuff is dissolved in 50 parts of hydrochloric acid and 500 parts of acetone and then 30 parts of 50% lead dioxide paste are added within the space of 10 minutes. The mixture is stirred first of all at 10° C. for 2 hours and then at 25° C. for two hours. Then 15 parts of crystallised sodium sulphate, dissolved in 50 parts of water, are added, the insoluble lead sulphate is filtered and washed with 50 parts of acetone.

The filtrate and the wash water are united and the acetone is eliminated by distillation. The residue is dissolved in 100 parts of acetic acid and 500 parts of water. 2 parts of animal black are added to this solution and filtered. The dyestuff is precipitated in the filtrate by the addition of 10 parts of 50% zinc chloride and the dyestuff separates in resin form. It corresponds to the formula:

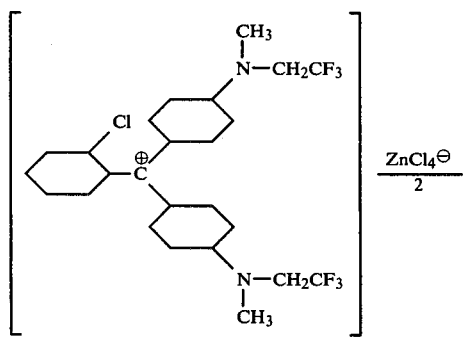

It dyes acrylic fibres a blue shade which is fast to light.

N-methyl N-(2,2,2-trifluoroethyl) aniline, which is mentioned in this Example, was prepared in the following manner:

70 parts of N-(2,2,2-trifluoroethyl) aniline, 70 parts of sodium bicarbonate and 100 parts of dimethyl sulphate are heated at 40° C. for 4 hours and then at 60° C. for 4 hours. After cooling, the reaction product is subjected to steam distillation. The distillate is extracted with sulphuric ether. After the ether has evaporated, 64.5 parts of a product are obtained whose composition, determined by chromatography in the gaseous phase, is
N-methyl N-(2,2,2-trifluoroethyl)aniline 97.2%
N-(2,2,2-trifluoroethyl) aniline 2.8%
Elementary Analysis: Found: C=57.4%, H=5.3%, F=29.5%, N=7.2%: Calculated: 57.14%, 5.29%, 30.16%, 7.40%.

EXAMPLE 3

A mixture comprising 3 parts of 2-chloro-N-methyl N-propionitrile-4-aminobenzophenone, 2 parts of N-ethyl N-(2,2,2-trifluoroethyl) aniline, 1 part of phosphorous pentoxide, 8.5 parts of phosphorus oxychloride is heated for 1 hour at 110° C. When the reaction is ended, the mixture is poured onto 100 parts of crushed ice. The dyestuff is precipitated by means of a solution of 50% zinc chloride. The aqueous phase is decanted and the dyestuff is dissolved again in 50 parts of acetic acid diluted with 200 parts of boiling water. One part of animal black is added and filtered. The dyestuff is again precipitated in the filtrate by means of a solution of 50% zinc chloride. It corresponds to the formula:

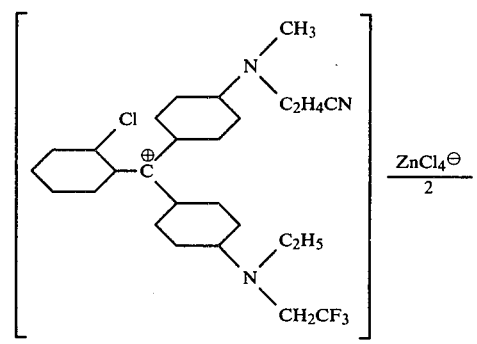

It dyes acrylic fibres a turquoise shade which is fast to light.

N-ethyl N-(2,2,2-trifluoroethyl)aniline, which is used in this Example, was prepared in the following manner.

87.5 parts of N-(2,2,2-trifluoroethyl) aniline, 87.5 parts of sodium bicarbonate and 154 parts of diethyl sulphate are heated for 6 hours at 40° C. and then for 15 hours at 100° C. After cooling, the product of the reaction is steam distilled. The distillate is extracted with sulphuric ether. After the ether has evaporated, 82.6 parts of a product are obtained whose composition, determined by chromatography in the gaseous phase, is
N-ethyl N-(2,2,2-trifluoroethyl) aniline 94.5%
N-(2,2,2-trifluoroethyl) aniline 5.5%
Elementary analysis: Found: C=59.3%, H=5.9%, F=27.0%, N=6.8%: Calculated: 59.11%, 5.91%, 28.07%, 6.89%.

By condensing the following benzophenones and anilines in an analogous manner dyestuffs are obtained with various shades having similar tinctorial properties.

| Example | Intermediates Benzophenones | substituted anilines | Shades on acrylic fibres |
|---|---|---|---|
| 4 | 4-dimethylamino-benzophenone | N-(2,2,2-trifluoroethyl) aniline | Violet blue |
| 5 | 4-dimethylamino-benzophenone | N-methyl N-(2,2,2-trifluoroethyl) aniline | Greenish blue |
| 6 | 4-dimethylamino-2'-chloro-benzophenone | N-methyl N-(2,2,2-trifluoroethyl) aniline | Blue |
| 7 | 4-dimethylamino-2'-chloro-benzophenone | N-ethyl N-(2,2,2-trifluoroethyl)-aniline | Bright blue |
| 8 | 4-dimethylamino-benzophenone | N-ethyl N-(2,2,2-trifluoroethyl)-aniline | Blue |
| 9 | 4-dimethylamino-4'-chloro-benzophenone | N-ethyl N-(2,2,2-trifluoroethyl)-aniline | Greenish blue |
| 10 | 4-dimethylamino-2'-4'-dichloro-benzophenone | N-ethyl N-(2,2,2-trifluoroethyl) aniline | Bright blue |
| 11 | 4-dimethylamino-benzophenone | N-methyl N-(2,2,2-trifluoroethyl)-3-methyl aniline | Dark blue |
| 12 | 4-dimethylamino-2'- | N-methyl N-(2,2,2- | Blue |

| Example | Intermediates | | Shades on acrylic fibres |
|---|---|---|---|
| | Benzophenones | substituted anilines | |
| | chloro-benzo-phenone | trifluoro)-3-ethyl-aniline | |
| 13 | 4'-methoxy-4-dimethyl amino-benzophenone | N-ethyl N-(2,2,2-tri-fluoroethyl) aniline | Dark brown |

N-methyl N-(2,2,2-trifluoroethyl)-m-toluidine, which is used in Examples 11 and 12, was prepared in the following manner:

The same method as in Example 2 is carried out using 56.7 parts of N-(2,2,2-trifluoroethyl)-m-toluidine, 53 parts of sodium bicarbonate and 75 parts of dimethyl sulphate. 52.8 parts, i.e. a yield equal to 86.7% of the theoretical yield, of N-methyl N-(2,2,2-trifluoroethyl)-m-toluidine are obtained.

By condensing one molecule of an aldehyde listed in column 1 of the Table below with two molecules of an amine listed in column 2 in accordance with the method of operation described in Example 2, other dyestuffs are obtained which dye acrylic fibres in shades having excellent fastness.

| Example | Aldehyde | Aniline | Shade on acrylic fibres |
|---|---|---|---|
| 14 | 2-chloro-benzalde-hyde | N-methyl N(2,2,2-trifluoroethyl)-3-methyl aniline | Green |
| 15 | 4-chloro-benz-aldehyde | N-methyl N-(2,2,2-trifluoro-ethyl)-3-methyl aniline | Green |
| 16 | 2-chloro-benzaldehyde | N-(2,2,2-trifluoro-ethyl)aniline | Blue |
| 17 | 4-chloro-benzaldehyde | N-(2,2,2-trifluoro-ethyl)aniline | Dull violet |

We claim:

1. Dyestuffs of the formula:

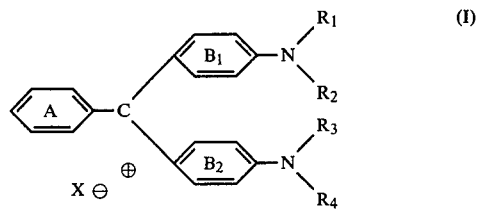

in which $R_2$ and $R_4$ which are the same or different each represent a hydrogen atom or an alkyl, hydroxyalkyl or cyanethyl group, one of the substituents $R_1$ and $R_3$ represents the 2,2,2-trifluoroethyl group and the other substituent represents an alkyl group or the 2,2,2-trifluoroethyl group, the ring A is unsubstituted by or substituted by one or 2 chlorine atoms or an alkoxy or alkyl group, the rings $B_1$ and $B_2$ are each unsubstituted or substituted by at least one alkyl or alkoxy group and X represnts a colourless monovalent anion.

2. Dyestuffs according to claim 1 wherein any alkyl group contains 1 to 4 carbon atoms.

3. Dyestuffs according to claim 1 wherein any alkoxy group contains 1 to 4 carbon atoms.

4. Dyestuffs according to claim 1 wherein the ring $B_1$ is substituted by one or two alkyl or alkoxy groups.

5. Dyestuffs according to claim 1 wherein the ring $B_2$ is substituted by one or two alkyl or alkoxy groups.

6. Process for the colouration of fibres based on a polymer or copolymer of acrylic nitrile or on polyamides or polyesters which have been modified by anionic groups in which the colouring agent is a dyestuff as claimed in claim 1.

7. Fibres based on a polymer or copolymer of acrylic nitrile or on polyamides or polyesters which have been modified by anionic groups coloured by means of a dyestuff as claimed in claim 1.

* * * * *